US012773789B2

(12) United States Patent
Running et al.

(10) Patent No.: US 12,773,789 B2
(45) Date of Patent: Oct. 27, 2026

(54) VARIABLE LOAD GEOMETRY CLAMP PRESSURE CONTROL

(71) Applicant: Cascade Corporation, Fairview, OR (US)

(72) Inventors: Brent G. Running, Hood River, OR (US); Christopher M. Walthers, Gresham, OR (US); Cory Evan Pearman, Oregon City, OR (US)

(73) Assignee: Cascade Corporation, Fairview, OR (US)

( * ) Notice: Subject to any disclaimer, the term of this patent is extended or adjusted under 35 U.S.C. 154(b) by 14 days.

(21) Appl. No.: 18/160,890

(22) Filed: Jan. 27, 2023

(65) Prior Publication Data

US 2023/0249359 A1 Aug. 10, 2023

Related U.S. Application Data

(60) Provisional application No. 63/303,782, filed on Jan. 27, 2022.

(51) Int. Cl.
*B25J 13/08* (2006.01)
*B25J 15/00* (2006.01)
*B25J 15/02* (2006.01)

(52) U.S. Cl.
CPC ........... *B25J 13/082* (2013.01); *B25J 13/087* (2013.01); *B25J 15/0038* (2013.01); *B25J 15/0206* (2013.01)

(58) Field of Classification Search
CPC .... B25J 13/082; B25J 13/087; B25J 15/0038; B25J 15/0206
See application file for complete search history.

(56) References Cited

U.S. PATENT DOCUMENTS 2,201,189 A 5/1940 Makaroff et al.
2,596,477 A * 5/1952 Frischmann ............ B66F 9/184 414/622
2,891,765 A 6/1959 Peame
2,942,848 A 6/1960 Friesen
2,967,717 A * 1/1961 Track ..................... B60G 11/26 267/64.11
2,984,072 A 5/1961 Born
(Continued)

FOREIGN PATENT DOCUMENTS

AU 2013221922 A1 5/2014
AU 2013249904 B2 12/2015
(Continued)

OTHER PUBLICATIONS

"UEX Appliance Clamp—VFC Volumetric Pressure Control," 2003, pp. 1-4, Cascade Corporation, Portland, Oregon.
(Continued)

*Primary Examiner* — Saul Rodriguez
*Assistant Examiner* — Brendan P Tighe
(74) *Attorney, Agent, or Firm* — Chernoff, Vilhauer, McClung & Stenzel, LLP

(57) ABSTRACT

A material handling clamp having a proportional relief valve delivering pressurized fluid to clamp arms that grasp a load, and having a controller configured to receive load geometry data and variably control the proportional relief valve to provide a target clamp force.

20 Claims, 9 Drawing Sheets

(56) References Cited

U.S. PATENT DOCUMENTS

| | | | | |
|---|---|---|---|---|
| 3,166,207 | A * | 1/1965 | Quayle .................. | B66F 9/183 414/667 |
| 3,178,156 | A | 4/1965 | Rigers | |
| 3,179,274 | A | 4/1965 | Comfort | |
| 3,265,357 | A | 8/1966 | Schilling | |
| 3,289,868 | A | 12/1966 | Miller et al. | |
| 3,317,004 | A | 5/1967 | Harrison | |
| 3,377,924 | A | 4/1968 | Spencer et al. | |
| 3,556,480 | A | 1/1971 | Johansson | |
| 3,625,115 | A | 12/1971 | Tani et al. | |
| 3,638,535 | A | 2/1972 | Pointer | |
| 3,648,565 | A | 3/1972 | Probst et al. | |
| 3,750,899 | A | 8/1973 | Greer | |
| 3,757,899 | A | 9/1973 | Smith, Jr. | |
| 3,769,881 | A | 11/1973 | Aoki | |
| 3,967,701 | A | 7/1976 | Hegenbart | |
| 3,968,730 | A | 7/1976 | Lionet | |
| 3,990,594 | A | 11/1976 | Olson et al. | |
| 4,050,673 | A | 9/1977 | Nishimura | |
| 4,230,304 | A | 10/1980 | Tol | |
| 4,241,581 | A | 12/1980 | Chace | |
| 4,241,901 | A | 12/1980 | Shircliffe | |
| 4,251,974 | A | 2/1981 | Vanderklaauw | |
| 4,279,564 | A | 7/1981 | Weinert | |
| 4,369,625 | A | 1/1983 | Izumi et al. | |
| 4,423,998 | A | 1/1984 | Inaba et al. | |
| 4,435,117 | A | 3/1984 | House | |
| 4,511,974 | A | 4/1985 | Nakene et al. | |
| 4,579,380 | A | 4/1986 | Zaremsky et al. | |
| 4,605,354 | A | 8/1986 | Daly | |
| 4,618,306 | A | 10/1986 | Dorsch | |
| 4,665,698 | A | 5/1987 | Trusock | |
| 4,671,166 | A | 6/1987 | Glaze et al. | |
| 4,679,489 | A | 7/1987 | Jasinski et al. | |
| 4,682,931 | A | 7/1987 | House | |
| 4,706,458 | A | 11/1987 | Corghi | |
| 4,714,399 | A | 12/1987 | Olson | |
| 4,726,729 | A | 2/1988 | Olson et al. | |
| 4,777,798 | A | 10/1988 | Jacobson et al. | |
| 4,815,712 | A | 3/1989 | Kawada | |
| 4,832,341 | A | 5/1989 | Muller et al. | |
| 4,848,732 | A | 7/1989 | Rossato | |
| 4,861,223 | A | 8/1989 | Olson | |
| 5,009,565 | A | 4/1991 | Esau | |
| 5,012,898 | A | 5/1991 | Tsymberov | |
| 5,024,141 | A | 6/1991 | Kawada | |
| 5,050,844 | A | 9/1991 | Hawk | |
| 5,052,882 | A | 10/1991 | Blau et al. | |
| 5,065,844 | A | 11/1991 | Hon | |
| 5,096,159 | A | 3/1992 | Fletcher | |
| 5,144,801 | A | 9/1992 | Scanderbeg et al. | |
| 5,199,686 | A | 4/1993 | Fletcher | |
| 5,292,219 | A | 3/1994 | Merin et al. | |
| 5,299,658 | A | 4/1994 | Cox et al. | |
| 5,330,168 | A | 7/1994 | Enomoto et al. | |
| 5,335,955 | A | 8/1994 | Pekka et al. | |
| 5,516,255 | A | 5/1996 | Tygard | |
| 5,597,987 | A | 1/1997 | Gilliland et al. | |
| 5,604,715 | A | 2/1997 | Aman et al. | |
| 5,706,408 | A | 1/1998 | Pryor | |
| 5,740,886 | A | 4/1998 | Fletcher | |
| 5,860,491 | A | 1/1999 | Fletcher | |
| 5,927,932 | A | 7/1999 | Seaberg | |
| 5,938,710 | A | 8/1999 | Lanza et al. | |
| 5,984,617 | A | 11/1999 | Seaberg | |
| 6,003,917 | A | 12/1999 | Tygard | |
| 6,013,211 | A | 1/2000 | Seki | |
| 6,027,302 | A | 2/2000 | Nilsson | |
| 6,135,704 | A | 10/2000 | Seaberg | |
| 6,186,280 | B1 | 2/2001 | Healy | |
| 6,189,432 | B1 | 2/2001 | Colarelli et al. | |
| 6,256,566 | B1 | 7/2001 | Kamiya et al. | |
| 6,321,634 | B1 | 11/2001 | Yeo et al. | |
| 6,332,098 | B2 | 12/2001 | Ross et al. | |
| 6,439,826 | B1 | 8/2002 | Jordan et al. | |
| 6,454,511 | B1 | 9/2002 | Jordan et al. | |
| 6,691,605 | B2 | 2/2004 | Rollgardh | |
| 6,789,458 | B2 | 9/2004 | Schumacher et al. | |
| 6,834,574 | B2 | 12/2004 | Neumann | |
| 6,964,322 | B2 | 11/2005 | Green et al. | |
| 7,047,865 | B2 | 5/2006 | Neumann | |
| 7,056,078 | B2 | 6/2006 | Seaberg | |
| 7,121,457 | B2 | 10/2006 | Michal, III | |
| 7,151,979 | B2 | 12/2006 | Andersen et al. | |
| 7,552,671 | B2 | 6/2009 | Neumann | |
| 7,699,141 | B2 | 4/2010 | Fossier et al. | |
| 8,078,315 | B2 | 12/2011 | McKernan et al. | |
| 8,439,181 | B2 | 5/2013 | Hausladen | |
| 8,755,929 | B2 | 6/2014 | McKernan et al. | |
| 8,781,617 | B2 | 7/2014 | McKernan et al. | |
| 8,781,618 | B2 | 7/2014 | McKernan et al. | |
| 9,114,963 | B2 | 8/2015 | McKernan et al. | |
| 9,139,407 | B2 | 9/2015 | McKernan et al. | |
| 10,087,958 | B2 | 10/2018 | McKernan et al. | |
| 2001/0039464 | A1 | 11/2001 | Hackauf | |
| 2002/0009356 | A1 | 1/2002 | Jordan et al. | |
| 2003/0233184 | A1 | 12/2003 | Roncari | |
| 2004/0083025 | A1 | 4/2004 | Yamanouchi et al. | |
| 2004/0102870 | A1 | 5/2004 | Andersen et al. | |
| 2005/0102081 | A1 | 5/2005 | Patterson | |
| 2006/0073001 | A1 | 4/2006 | Chase | |
| 2006/0115354 | A1 | 6/2006 | Prentice et al. | |
| 2009/0059004 | A1 | 3/2009 | Bochicchio | |
| 2009/0094971 | A1 | 4/2009 | Dantas et al. | |
| 2009/0174538 | A1 | 7/2009 | Shibata et al. | |
| 2009/0281655 | A1 | 11/2009 | McKernan et al. | |
| 2011/0137489 | A1 | 6/2011 | Gilleland et al. | |
| 2013/0058746 | A1 | 3/2013 | Chase | |
| 2013/0277584 | A1 | 10/2013 | McKernan et al. | |
| 2014/0121823 | A1 | 5/2014 | McKernan et al. | |
| 2014/0121824 | A1 | 5/2014 | McKernan et al. | |
| 2014/0121825 | A1 | 5/2014 | McKernan et al. | |
| 2014/0240117 | A1* | 8/2014 | McKernan .............. | B66F 9/184 340/440 |
| 2014/0244025 | A1 | 8/2014 | McKernan et al. | |
| 2015/0368080 | A1* | 12/2015 | Dal Dosso .............. | B66F 9/125 701/50 |
| 2016/0233687 | A1* | 8/2016 | McKernan ................ | B66F 9/22 |
| 2018/0363682 | A1 | 12/2018 | McKernan et al. | |

FOREIGN PATENT DOCUMENTS

| | | | |
|---|---|---|---|
| BR | 1120150129021 | B1 | 2/2022 |
| CA | 2720456 | A1 | 11/2009 |
| CA | 2862887 | A1 | 10/2013 |
| CA | 2828429 | A1 | 11/2014 |
| CN | 2928408 | Y | 8/2007 |
| CN | 101672311 | A | 3/2010 |
| CN | 101713190 | A | 5/2010 |
| CN | 101828043 | A | 9/2010 |
| CN | 102021899 | A | 4/2011 |
| CN | 102083736 | A | 6/2011 |
| CN | 102159491 | A | 8/2011 |
| CN | 102441589 | A | 5/2012 |
| CN | 201380001103 | A | 6/2013 |
| CN | ZL200980126387.2 | B | 3/2014 |
| CN | 103958390 | A | 7/2014 |
| CN | 104822617 | A | 8/2015 |
| CN | 104822617 | B | 2/2017 |
| DE | 3433136 | A1 | 3/1986 |
| DE | 3801133 | A1 | 7/1989 |
| DE | 3801133 | C2 | 3/1995 |
| DE | 4433050 | A1 | 3/1996 |
| DE | 19964034 | A1 | 7/2001 |
| DE | 10005220 | A1 | 8/2001 |
| DE | 10005220 | C2 | 1/2002 |
| DE | 19964034 | C2 | 1/2002 |
| DE | 4433050 | B4 | 1/2004 |
| EP | 0206382 | A2 | 12/1986 |
| EP | 0244983 | A2 | 11/1987 |
| EP | 0386569 | A1 | 9/1990 |
| EP | 0724541 | B1 | 2/1999 |
| EP | 0995557 | A2 | 4/2000 |
| EP | 1122208 | A2 | 8/2001 |

(56) References Cited

FOREIGN PATENT DOCUMENTS

| | | | |
|---|---|---|---|
| EP | 1122209 | A1 | 8/2001 |
| EP | 1371601 | A2 | 12/2003 |
| EP | 1408001 | A1 | 4/2004 |
| EP | 1953022 | A1 | 8/2008 |
| EP | 2271579 | B1 | 5/2012 |
| EP | 2751015 | A1 | 7/2014 |
| EP | 2839171 | B1 | 3/2019 |
| EP | 2909125 | B1 | 3/2020 |
| JP | S57-171515 | U1 | 10/1982 |
| JP | 3166199 | A | 7/1991 |
| JP | H06-016398 | U | 3/1994 |
| JP | H06159323 | A | 6/1994 |
| JP | H11-335099 | A | 12/1999 |
| JP | H11-343099 | A | 12/1999 |
| JP | 2000191294 | A | 7/2000 |
| JP | 2000229793 | A | 8/2000 |
| JP | 2000344499 | A | 12/2000 |
| JP | 2003238071 | A | 8/2003 |
| JP | 2004189362 | A | 7/2004 |
| JP | 2004277020 | A | 10/2004 |
| JP | 2008127178 | A | 6/2008 |
| JP | 2010207869 | A | 9/2010 |
| JP | 2011519801 | A | 7/2011 |
| JP | 5484448 | B2 | 5/2014 |
| JP | 6309046 | B2 | 3/2018 |
| WO | 1992000913 | A1 | 1/1992 |
| WO | 1995011189 | A1 | 4/1995 |
| WO | 2005111750 | A1 | 11/2005 |
| WO | 2008040853 | A1 | 4/2008 |
| WO | 2009036562 | A2 | 3/2009 |
| WO | 2009136986 | A1 | 11/2009 |
| WO | 2010134110 | A1 | 11/2010 |
| WO | 2013158199 | A1 | 10/2013 |
| WO | 2014070257 | A1 | 5/2014 |
| WO | 2014133579 | A1 | 9/2014 |
| WO | 2015069364 | A1 | 5/2015 |
| WO | 2015069365 | A1 | 5/2015 |
| WO | 2023147494 | A1 | 8/2023 |

OTHER PUBLICATIONS

Extended European Search Report (EESR) issued by the European Patent Office (EPO) for EP Patent No. 23747898.7, dated Dec. 22, 2025, pp. 1-8.

* cited by examiner

VARIABLE LOAD GEOMETRY CLAMP PRESSURE CONTROL

CROSS-REFERENCE TO RELATED APPLICATIONS

This application claims priority under 35 U.S.C. § 119(e) to U.S. Provisional Patent Application No. 63/303,782 filed on Jan. 27, 2022, the contents of which are hereby incorporated by reference in their entirety.

BACKGROUND OF THE INVENTION

This disclosure relates to improvements in clamps normally mounted on lift trucks, Automated Guided Vehicles (AGVs), or other industrial vehicles for clamping and manipulating loads, such as paper rolls, tissue rolls, industrial toweling tissue, etc.

Clamp attachments such as, for example, pivoting arm roll clamps, made to mount on lift trucks and other vehicles, are widely used in handling loads of differing geometries, e.g., rolls of paper products, such as newsprint and kraft paper, as well as other materials, each of differing diameters, lengths, etc. Pivoting arm roll clamps allow a paper roll or other cylindrical load to be grasped or released from either a long-arm/short-arm configuration or an equal-arm configuration. Typically, roll clamps are rotatable to engage, transport, and deposit a roll with the longitudinal axis of the roll either vertical or horizontal. If the roll is lying on a surface with the axis of the roll horizontal, it is preferable that the long-arm/short-arm configuration be used where the arms at the top of the horizontally-oriented clamping attachment extend forward of the lift vehicle further than the lower arms, so that the upper arm can overreach the roll enabling the clamp pads at the ends of the upper and lower arms to engage the roll at diametrically opposed positions without requiring that the lower arm be pushed under the roll, which is likely to cause it to roll away from the clamp. On the other hand, when a roll is transported or stacked with the longitudinal axis vertical, it is often preferable that the equal-arm configuration be used where the arms on both sides of the roll extend equally far forward of the lift vehicle to facilitate inserting both arms between closely adjacent rolls without damaging them. However, even when grasping or releasing a roll in a vertical orientation, it is sometimes useful to use a long-arm/short-arm configuration if the roll is grasped from, or released to, a location abutting a wall or other surface.

Due to the deformable nature of the material being grasped and lifted, one recurring problem with clamps, such as pivoting arm clamps, is that they may easily damage the load when too much clamping pressure is applied. This problem is exacerbated by the fact that clamps are designed to handle rolls of differing geometries. For example, because the clamp pressure applied by the clamp pads of a pivoting arm clamp varies based on arm position it is frequently difficult to apply the precise clamp force necessary to securely grasp the roll without damaging it.

What is desired therefore, are improved devices, systems, and methods that securely grasp loads without damaging them.

DETAILED DESCRIPTION OF PREFERRED EMBODIMENT

Figure 1:
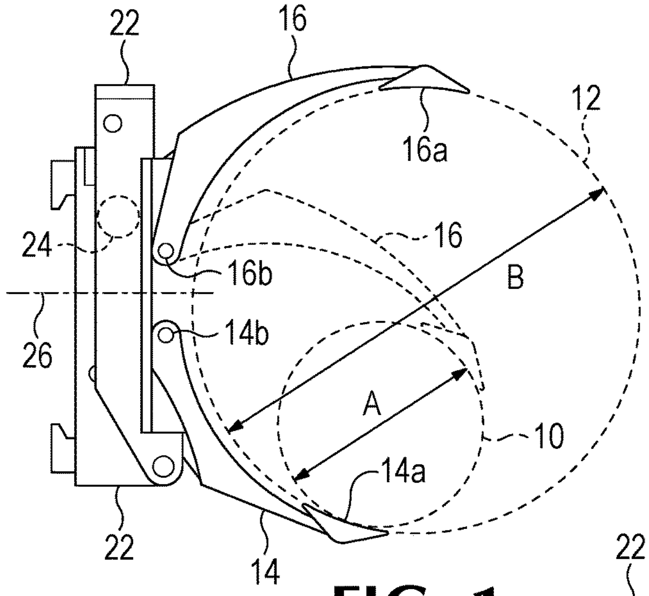
FIGS. 1-3 are simplified schematic drawings of an exemplary clamp that grips a load in different orientations.

FIG. 1 shows an exemplary roll clamp used to describe the systems and methods disclosed in the present specification, and capable of alternatively grasping rolls 10 or 12 of different respective geometries e.g., diameters A or B, both in a horizontal-axis, or "bilge," position engaged by a short arm 14 and a long arm 16, each arm having a respective engagement clamping surface 14*a*, 16*a* of the type described above. The clamp arms 14 and 16 are pivotally mounted on a frame assembly 22 by respective pivot pins such as 14*b* and 16*b* to enable opening and closing of the clamp arms by hydraulic cylinders (not shown), but in some cases the clamp arms may be slidably movable toward and away from each other to enable opening and closing.

Figure 2:
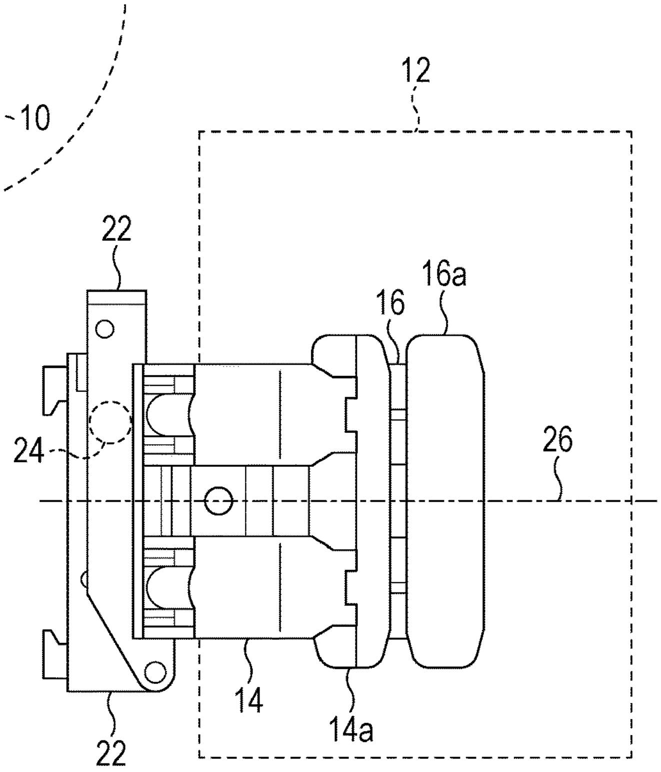
Figure 3:
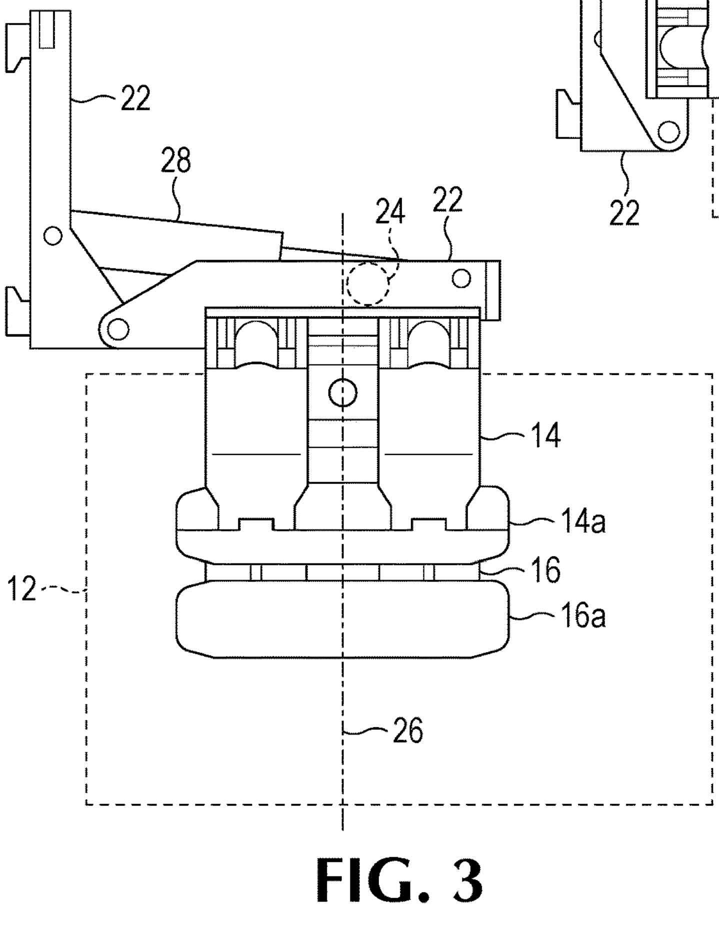

If the rolls are also expected to be handled with their axes extending vertically, the frame assembly 22 may be equipped with a worm-driving rotator motor such as 24 which can selectively rotate the frame assembly 22, and thus the clamp arms 14 and 16, about a forwardly-extending axis of rotation 26 to positions where they are spaced horizontally for picking up or depositing a vertically oriented roll 12 as shown in FIG. 2. Or, as a still further alternative, the frame assembly may be equipped with a forwardly-rotating upender which can selectively pivot the frame assembly 22 forwardly 90 degrees, by extension of hydraulic cylinders such as 28, to permit the clamp arms to pick up or deposit a horizontal roll 12 from above as exemplified by FIG. 3. In such case, the rotator 24 may also be usable to rotate the clamp arms and the roll horizontally about the now vertically extending axis 26 shown in FIG. 3.

Unequal-length clamp arm arrangements often encounter certain problems in their attempts to handle rolls, sometimes for example because of the low-density softness of the rolls, which creates an exceptionally large flat deformation in the bottom of a tissue roll when in the "bilge" position. As the flat deformation of a tissue roll becomes larger, the lower clamp arm 14 must become shorter and the upper clamp arm 16 must become longer in order to clamp the roll 12 substantially diametrically in the "bilge" position. This means that the longer upper clamp arm 16 must now reach around the roll further to clamp it on the roll's diameter B.

Because of this, the upper clamp arm 16 must open significantly further to clear the roll at the "clearance" position when approaching the roll, which limits the diameter of the largest roll which can be engaged by the clamp. Additionally, when the roll is in a vertical position, the longer clamp arm is also more difficult to position so that it reaches around the roll, and this problem is especially severe if it is desired to clamp small diameter rolls, thereby making it difficult for the same clamp to be used to clamp both large diameter and small diameter rolls.

Equal-length clamp arm arrangements have also been used instead of the foregoing unequal-length arm arrangements for the handling of high-density paper rolls. Such equal-arm arrangements, the absence of a lower short arm 14 may make handling of lower density rolls in the horizontal "bilge" configuration susceptible to increasing roll damage as the flat deformation 25 of the tissue roll becomes larger. This is because the equal-length lower clamp arm may be required to forcibly insert itself into the area, between the flat deformation 25 of the roll and the supporting floor, to reach a substantially vertically oriented clamping roll diameter between the upper clamping surface and the lower clamping surface of an equal-length clamp arm arrangement. The resultant risk of damage caused by such a forcible insertion of the lower clamp arm could be high in the case of a low-density roll.

Figure 4:
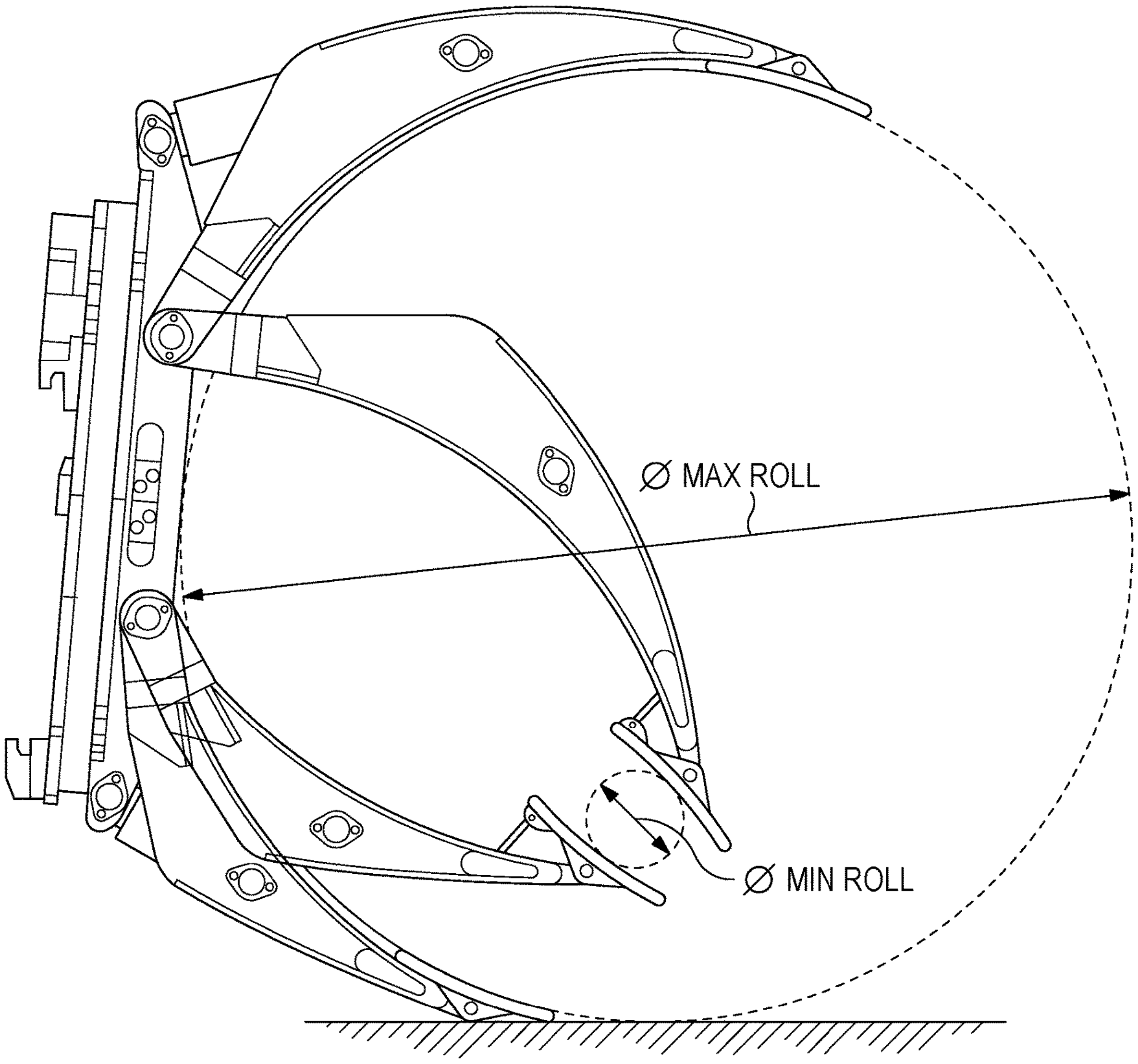
FIG. 4 shows an exemplary clamp used to clamp rolls of a maximum diameter for which the roll clamp is capable, and a minimum diameter of which the roll is capable.

In any circumstance, pivoting roll clamps of either a short arm—long arm configuration or an equal arm configuration, generate a clamp force that is a function of both the arm opening position (roll diameter) and clamping pressure. As a result of the geometry of the paper roll clamp, as can be seen in FIG. 4, the force generated varies based on arm position. Historically, the pressure has been controlled by a single relief valve with a single fixed setting that is usually set to the maximum design pressure. This generates clamp force values over a range of different roll diameters as shown in FIGS. 5 and 6, as further described below.

This roll handling methodology (fixed pressure setting, variable diameters) results in potential over or under clamping of rolls at diameters other than the design operating diameter. To address this issue and apply the precise clamp force for every roll diameter, improved pivoting arm clamps may preferably use a proportional pressure relief valve controlled by an embedded controller that is able to continuously vary the pressure to pre-determined values taken from internal or external sources. An example of an external source may be a Warehouse Management System (WMS). Load details delivered to the attachment control system may be used to directly calculate optimal clamping force for the load about to be handled.

An example of an internal source is a table contained within a systems controller. In this example, sensor readings may determine load specification that may in turn be utilized by the attachment controller to derive optimized clamping force by referencing the table. The sensor measurements can also be utilized to alert an operator or provide feedback information to a host AGV (Automated Guided Vehicle) when ideal handling practices have been achieved, e.g., ideal contact pad placement. They can also be employed to further optimize clamp force during non-ideal handling practices. This is especially important in human-operated applications to compensate for the expected variation while approaching and engaging the load.

In both external and internal cases, the clamping pressure delivered to the attachment is calculated based on the force identified, the position of the arms, and the geometry of the clamp. A proportional relief is then used during clamping process in order to modulate the pressure and achieve calculated value.

In addition to calculating the optimized clamp force for varying load types, sizes, and weights, the system herein described is able to monitor, deliver, and maintain optimized clamp force during all aspects of material handling, such as, initial contact with the load, lifting, transporting, and depositing the load. These handling scenarios will cause variations in the applied clamp force and need to be accounted for to achieve optimal handling performance and reduce load damage.

Figure 5A:
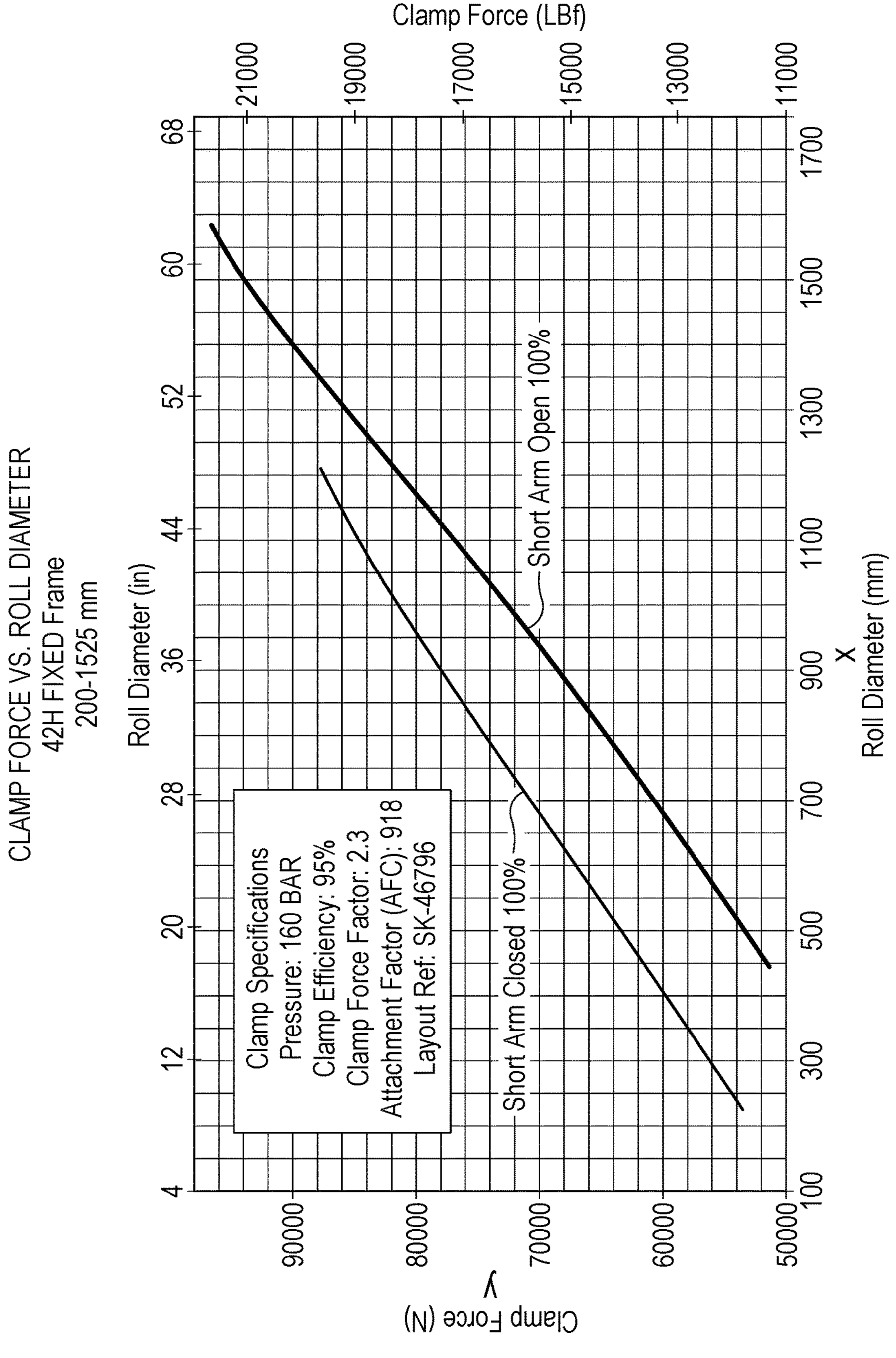
FIG. 5A shows clamp force as a function of load geometry for the roll clamp of FIG. 4 depending on whether the short-arm of the clamp is in the fully extended position or the fully retraced position.
Figure 6:
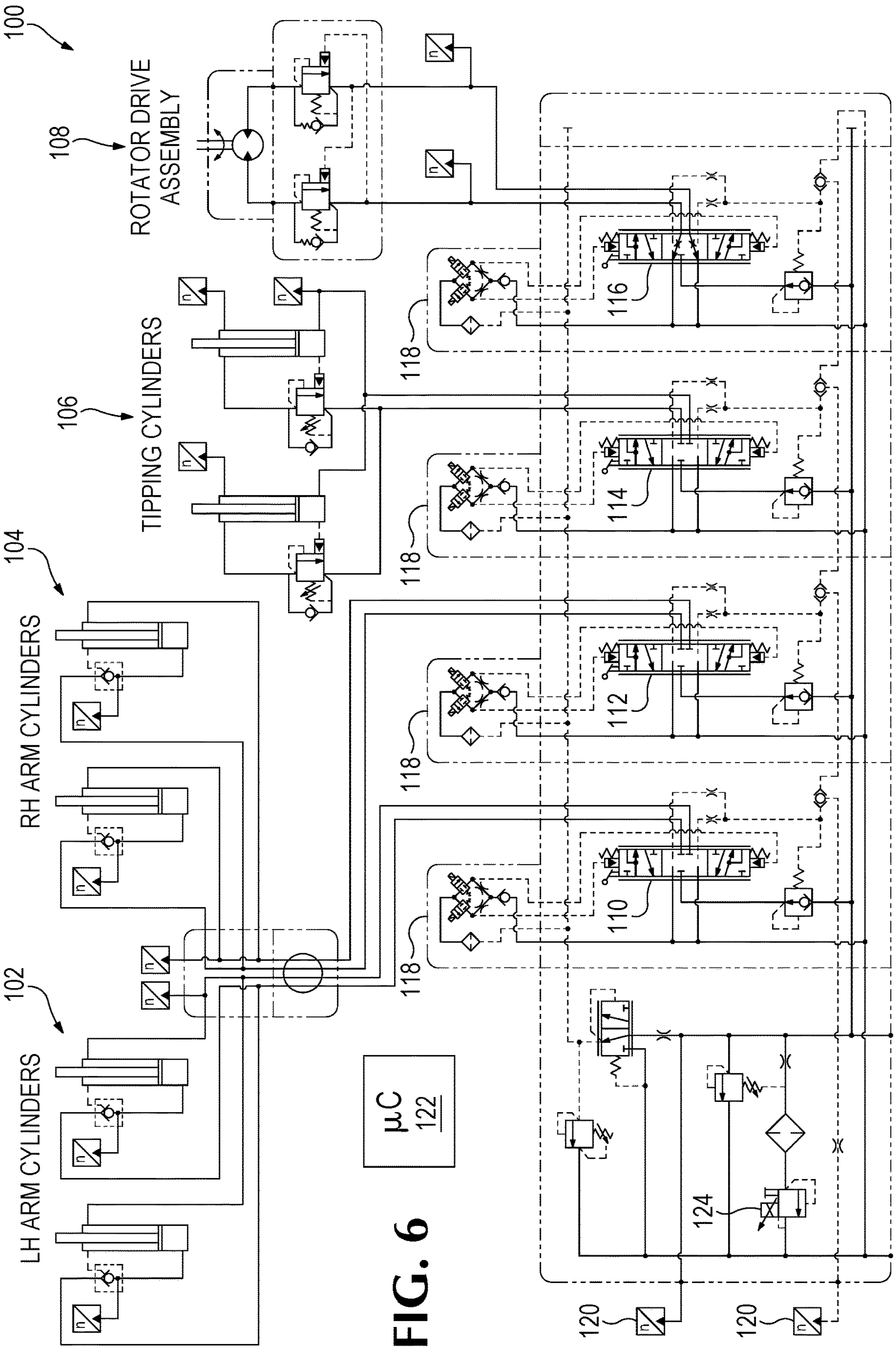
FIG. 6 shows an exemplary hydraulic circuit having proportional relief valves capable of varying a target clamp force to grip a load based on the geometry of the load.

Referring to FIG. 5A, for example, which shows clamp force profiles (in Newtons) for a specific clamp as a function of: i) clamp pressure (y-axis); ii) roll diameter (x-axis); and iii) clamp configuration (two curves). Assume, for example, that a clamp attachment whose force profiles are shown in this figure is used to grasp a load weighing 2000 kg and in a short arm open configuration, which mean the short arm is in the position shown in FIG. 1. Also assume that the diameter of the load is 1200 mm. Also assume that the clamp attachment has, or is given, data indicating a clamp force factor (CFF) of 2.3 as shown in this figure. This latter metric is a scaling factor used to determine a target clamp force, and is measured based on the specific characteristics or type of load e.g., newspaper, tissue, etc. Specifically, for a 2000 kg load, at 9.8 m/s^2 of gravitational acceleration and a clamp force factor of 2.3, target clamp force would be 45,080 Newton's (Mass×Gravity×CFF). The force profile of FIG. 5A shows that a roll diameter of 1200 mm is associated with 80,000 Newtons at maximum pressure. Hence the proportional relief valve would be used to provide a target gripping force of only 45080 Newtons by reducing the clamp force to approximately 90 bar (160 bar×45/80).

Figure 5B:
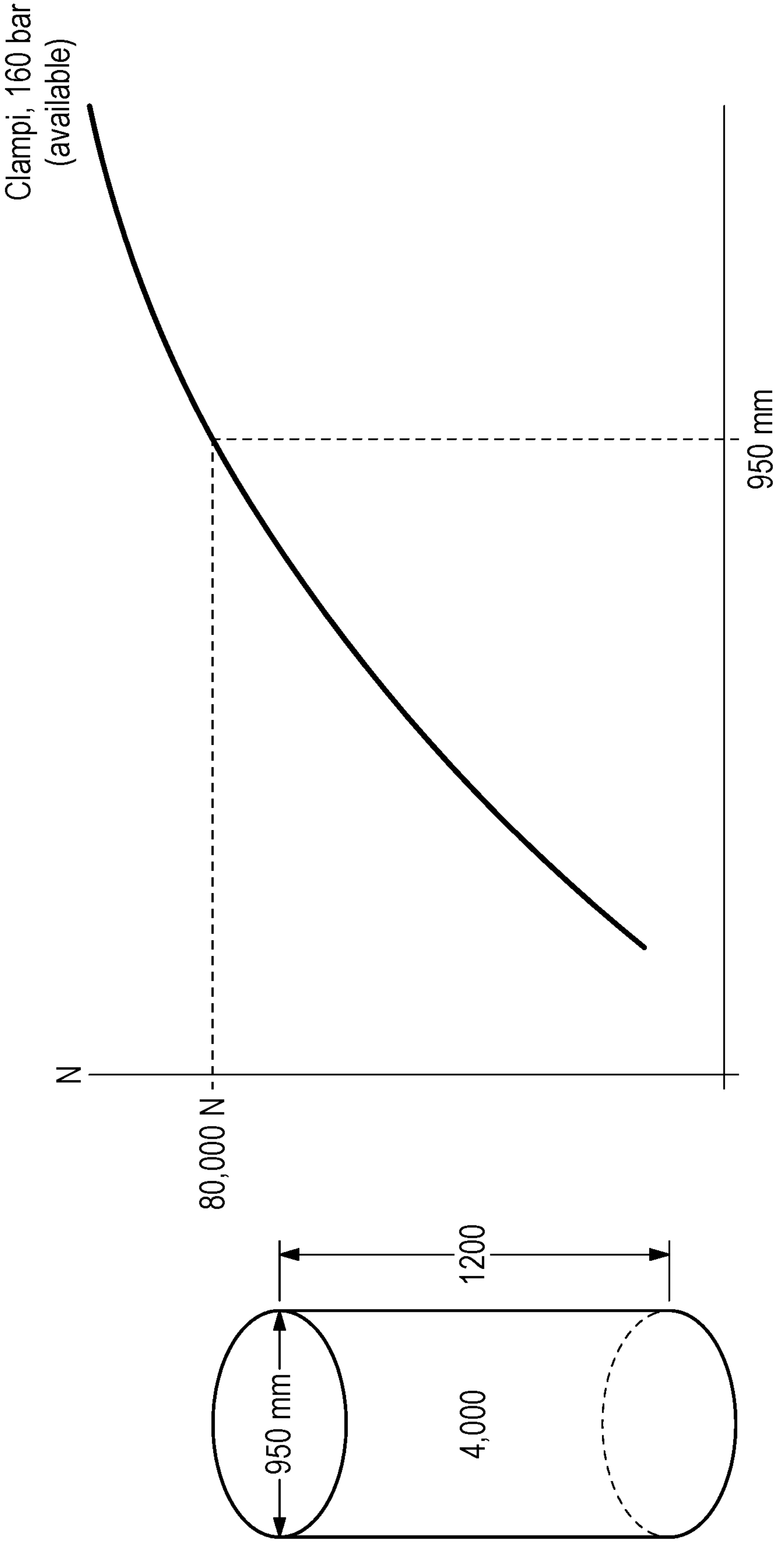
FIG. 5B shows clamp force as a function of load geometry for an equal arm roll clamp as a function of roll diameter.

Referring to FIG. 5B, an equal arm clamp may be used as well, in which case there may be only a single clamp force profile. Assume for example, that an equal arm clamp is used to grasp a 4,000 kg load of 950 mm in diameter and a CFF of 1.5. Given the table shown in FIG. 5B, a target clamp force of 58,800 Newtons would be calculated (4000×9.8×1.5), and a clamp pressure of 118 bar selected (160 bar×58,800/80,000).

Those of ordinary skill in the art will appreciate that the curves shown in FIGS. 5A and 5B are exemplary, and that different clamps of various constructions will exhibit different profiles. Moreover, though FIG. 5A, for example, only shows two curves and FIG. 5B only shown one curve, some embodiments may employ a different number of curves, each curve reflecting a different joint position of the two arms. That is to say, in a long-arm-short arm configuration, the short arm may be in a position other than completely open or completely closed. Similarly, it is possible that some equal arm clamps may have different force profiles based on the angular position relative to the mast of the vehicle by which the arms grasp the load.

The clamp force factor, along with any other load information such as load type, load height (or width), load diameter, weight etc. used to determine a target clamp force may be provided to the disclosed clamp in any appropriate manner. As one example, the clamp force factor(s) may be stored in tables in memory within the clamp, or within the vehicle to which the clamp is attached. In other embodiments, such data may be provided to the clamp wirelessly by e.g., a Warehouse Management System that manages the operation of AGVs.

In some other embodiments, particularly where multiple items are to be grasped as a single load, the target clamp force may be based on a received density. That is to say, the disclosed clamp attachments may receive information as to the load geometry e.g., height (often referred to as width) and load diameter of an individual item in a load, as well as the load density and the number of individual items being grasped, after which a load weight may be calculated for use in the tables such as those disclosed in FIGS. 5A and 5B.

Some embodiments may also include sensors on the clamp that are used to measure load parameters, such as diameter, height, the number of items, etc. These sensors may be integrated into the load engaging surfaces e.g., contact pads as well as arm positional sensors, and pressure transducers. Also, in some embodiments the disclosed attachment may be equipped with sensors such as load weight sensors capable of detecting load weight. Information from these sensors may be used for several purposes. The disclosed clamps may for example, in some embodiments, use such sensory information to perform the clamp calculations themselves i.e., the clamp may automatically adjust its clamp pressure based on geometry received from its own sensors as a substitute for information that otherwise might have to come from a database, and operator, a Warehouse Management System, etc. Alternatively, such information may be used to verify that information retrieved by the clamp from some other source and related to the load geometry or other load data is correct. If it is not correct, an alert may be signaled and/or a clamping operation may be suspended.

In this vein, some disclosed embodiments may employ feedback to verify and/or adjust the target clamp force and/or the rate at which the target clamp force is achieved. For example, the hydraulic inlet pressure and the hydraulic output pressure of the actuators may be measured and used to provide feedback of actual clamp force. Similarly, in some embodiments, optimal clamp force may be initially achieved by continual feedback monitoring for clamp actuator stabilization, arm movement, and minimum clamp generation time (e.g., limiting the speed at which the maximum clamp pressure may be approached) based on anticipated load geometry. Such feedback largely minimizes the time to generate clamp force, while also reducing the possibility of overshooting the target clamp force, thus reducing the risk of damage to the load.

Also, in some embodiments, the use of sensors as described above may be used to sense when a clamp pad approaches or contacts the load, and prevents any additional movement of that arm until the other arm reaches the same position. This prevents damage due to sliding the load on the ground if the vehicle has not perfectly approached the load.

FIG. 6 shows an exemplary hydraulic circuit 100 capable of proportionally adjusting clamp pressure. Specifically, the circuit 100 may direct fluid from one or more reservoirs (not shown) independently to a pair of left arm cylinders 102, a pair of right arm cylinders 104, a pair of tipping cylinders 106, and a rotator drive assembly 108. The hydraulic circuit 100 also preferably includes a first proportional directional control valve 110 that modulates the flow flowing to the pair of left arm cylinders 102, and includes a second proportional directional control valve 112 that modulates the flow flowing to the pair of left arm cylinders 104. A proportional directional control valve 114 modulates the flow to the tipping cylinders 106, while a proportional directional control valve 116 modulates the flow to the rotator drive assembly. A system proportional relief control valve 124 modulates the pressure to all hydraulic elements in circuit 100. In some embodiments, the proportional directional control valves 110, 112, 114, and 116 are electronically controlled using pilot assist circuits 118 and transducers 120. The operations of the clamp as described herein e.g., controlling the transducers, performing calculations, etc. may preferably be made using the controller 122 preferably mounted on the attachment, but some embodiments may use a controller mounted on a vehicle or elsewhere, and merely send signals to hydraulic/electrical components on the attachment to control its operation.

Figure 7:
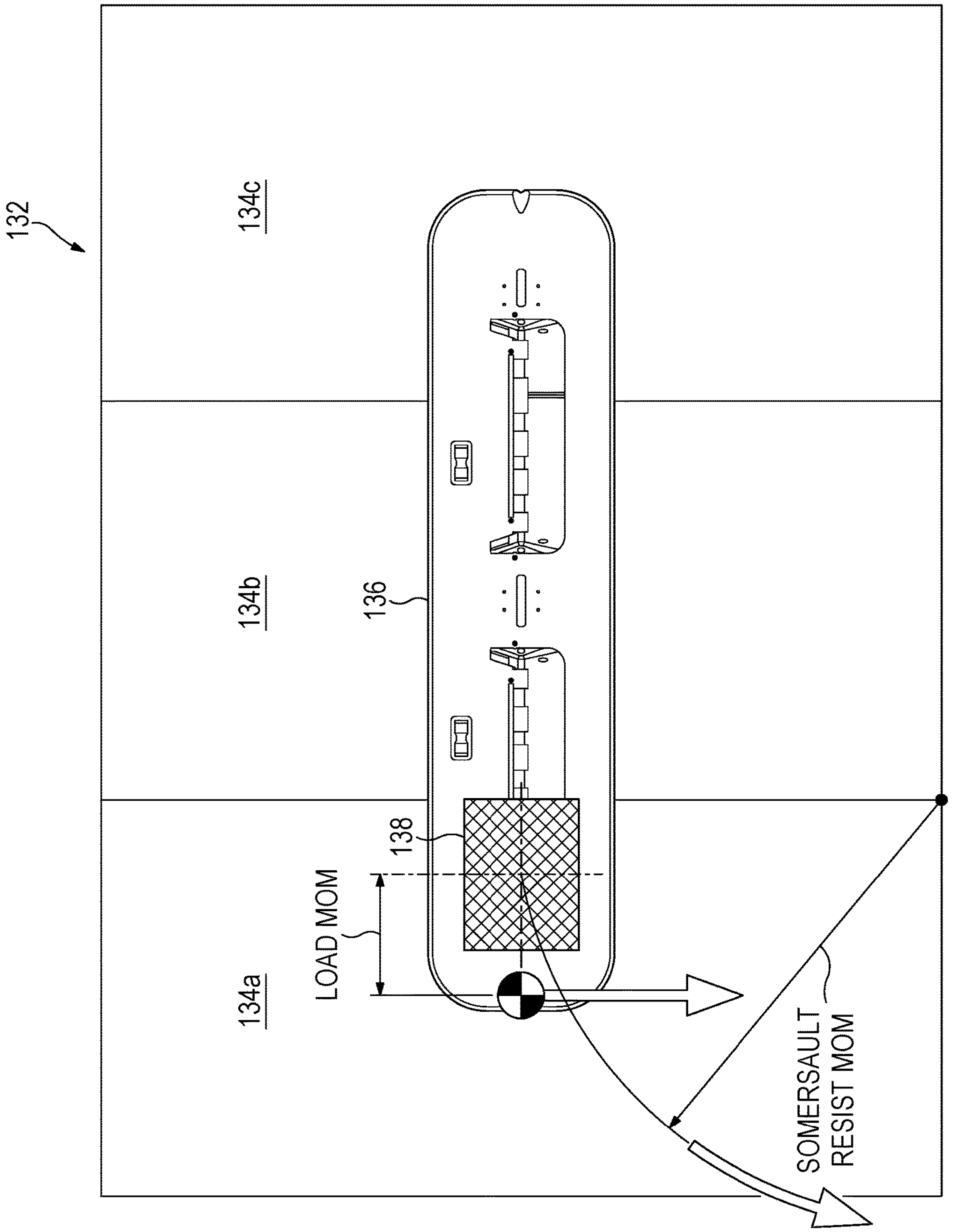
FIG. 7 shows a clamp arm gripping multiple items at once, where the center of gravity of one of the items lies beyond the clamp contact pad.

In some embodiments, the disclosed attachments may make adjustments to the initial calculations described with respect to FIGS. 5A and 5B. As one example, referring to FIG. 7, which shows an arrangement in which a load 132, which comprises three identical units 134*a*, 134,*b*, and 134*c*, is being grasped by an attachment having a pair of clamp arms 136 (only one of which is shown). The clamp arms 136 have contact pads 138 that grasp the entire load, but as can be seen in this figure, the unit 134 has a center of gravity beyond the location at which a contact pad 38 grasps it. (Note that the clamp arms 136 have flared tips that bend away from the load). In this circumstance, the item 134*a* generates a moment about its lowermost point on the right, and may therefore tend to tip outwards, even when the target clamp force calculated according to FIG. 5A or 5B is used. Using the received load geometry and/or sensor data, the disclosed attachments may in these embodiments calculate a minimum correction of clamp force that needs to be added to the target clamp force calculated using the curves as previously described, in order to counteract this moment.

Figure 9A:
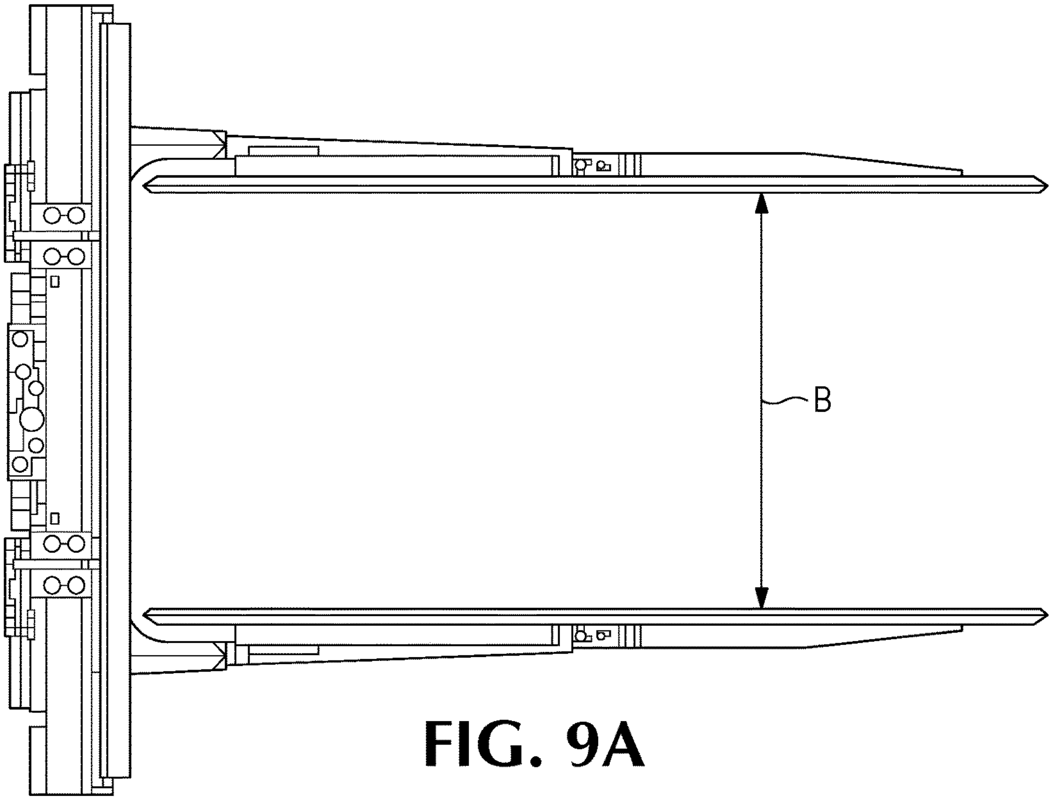
FIGS. 9A and 9B illustrate an exemplary clamp holding a load of width "B" between spaced apart arms, and with a Center of Gravity, HCG.
Figure 9B:
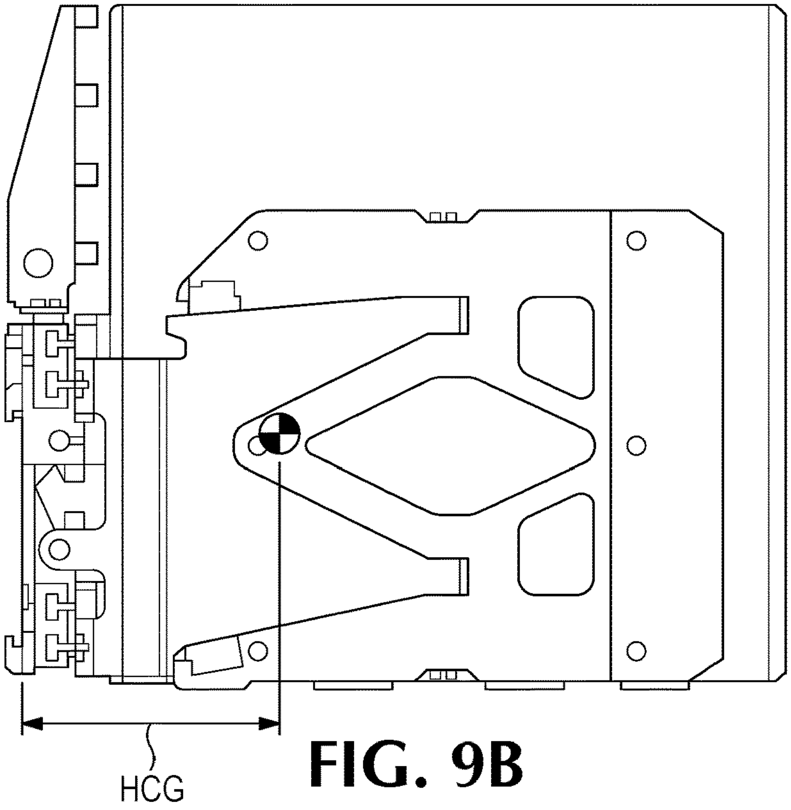
Figure 10A:
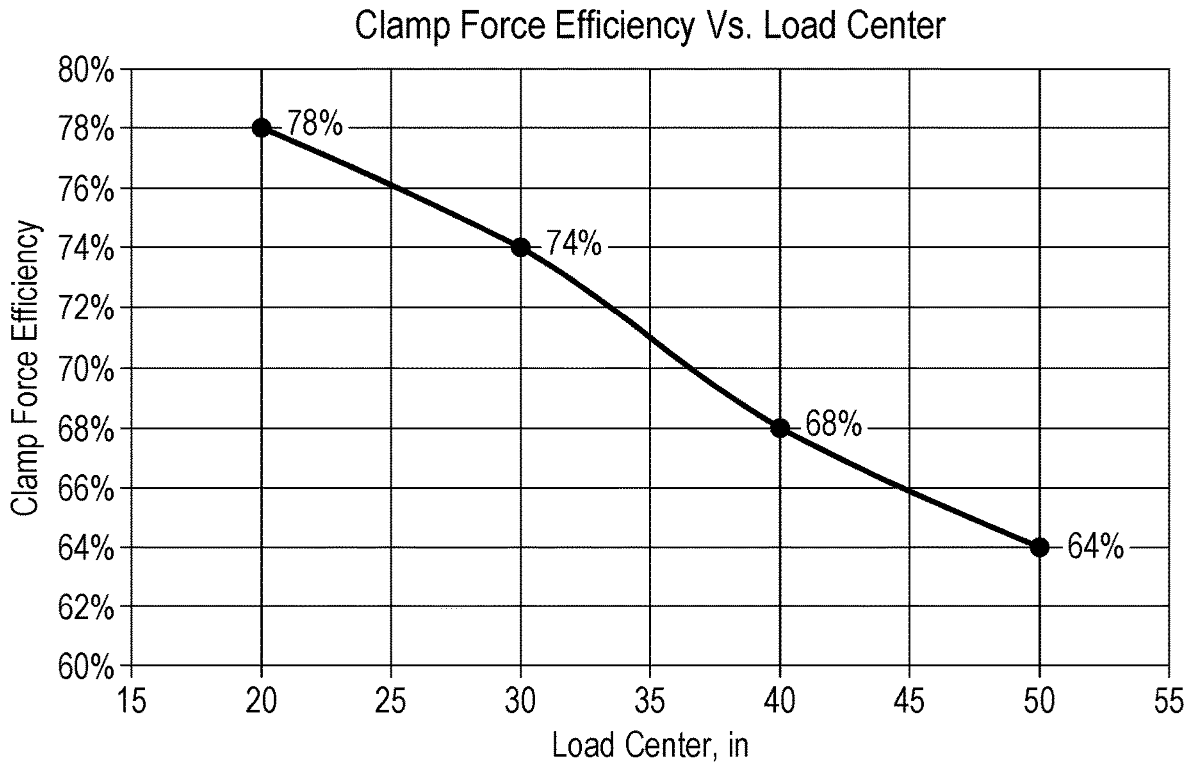
FIGS. 10A and 10B illustrate exemplary efficiency losses in clamp force as a function of the variables B and HCG shown in FIGS. 9A and 9B.
Figure 10B:
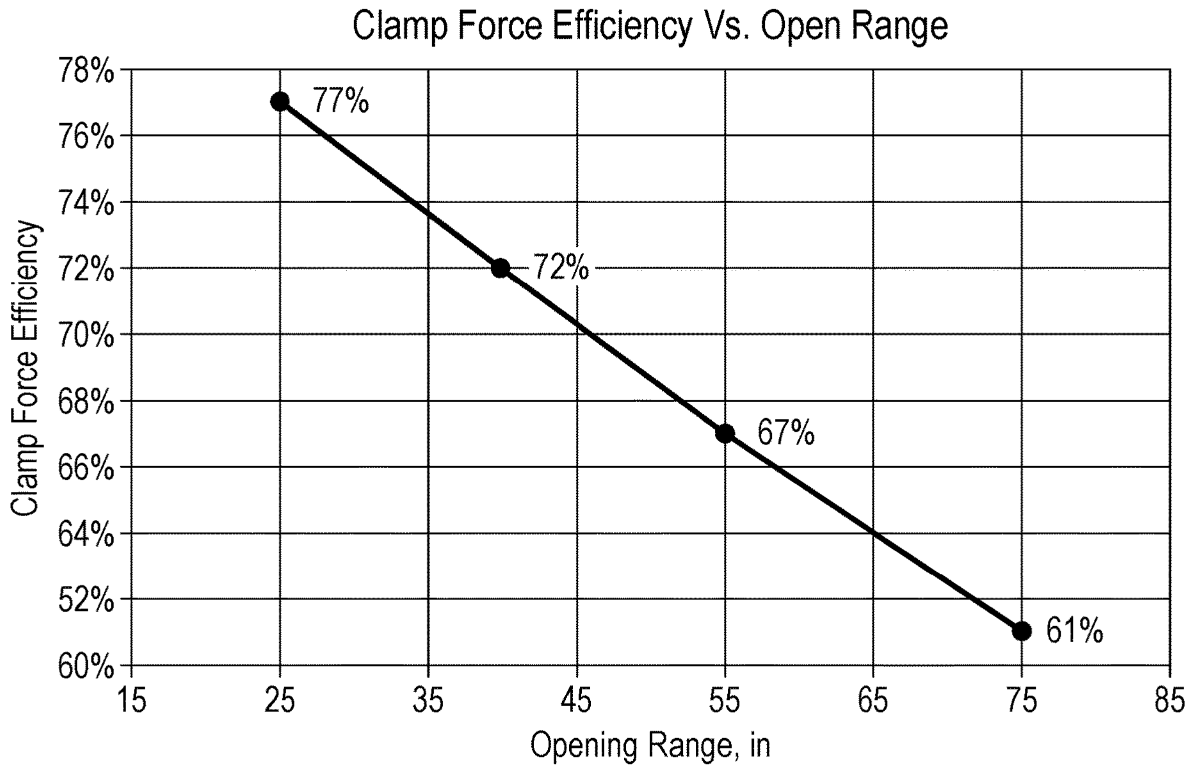

Also, some embodiments of the disclosed clamps may also consider clamp force efficiency (defined as resulting clamp force divided by actuator force) when calculating a target clamp force, so as to adjust for arm-to-frame engagement and/or effective load center position. Referring for example to FIGS. 9A and 9B, a clamp attachment may grasp a load having a load of width “B” with center of gravity at distance HCD. As the load center of gravity extends, the reactionary load on the bearings that support the clamp arms increases, which results in decreased clamp force efficiency as shown in FIG. 10A. Similarly, referring to FIGS. 10B, at larger opening ranges “B,” the arm-to-frame engagement decreases, which also results in increased reactionary loads on the bearings and decreased clamp force efficiency. This loss in efficiency may be used to adjust the pressure provided to the actuators 102, 104 to ensure that the supplied pressure achieves the desired target clamp force. Non-cylindrical loads could be handled by a linear translating clamp (sliding arm clamp).

Figure 8B:
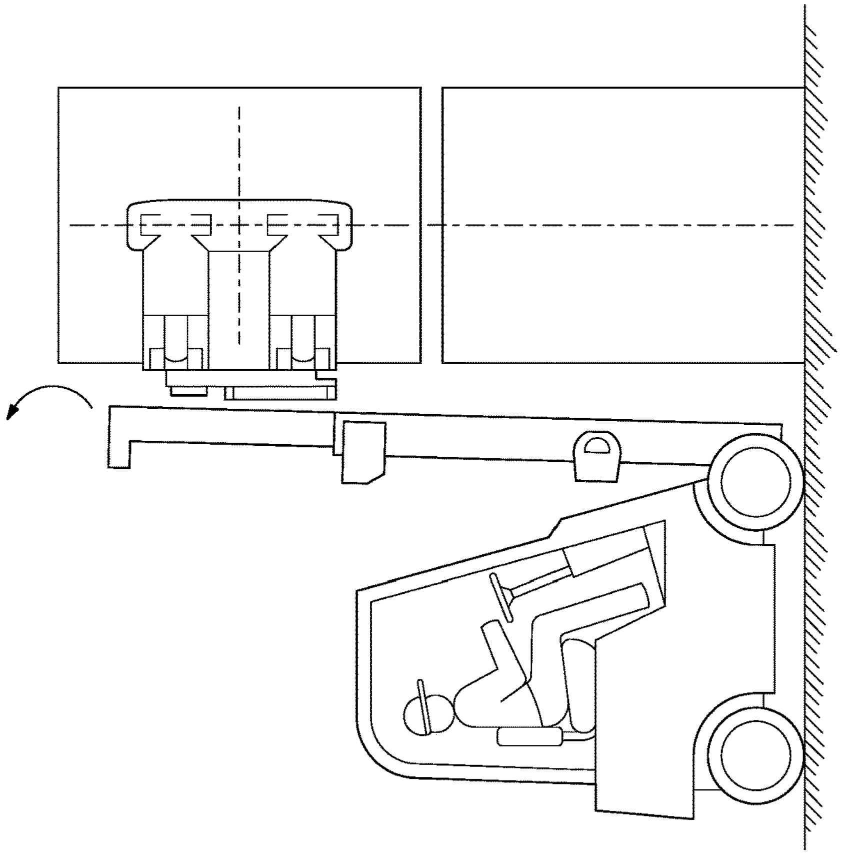
FIGS. 8A and 8B show an exemplary clamp tilt angle adjustment to counteract load tilt relative to a vehicle.
Figure 8A:
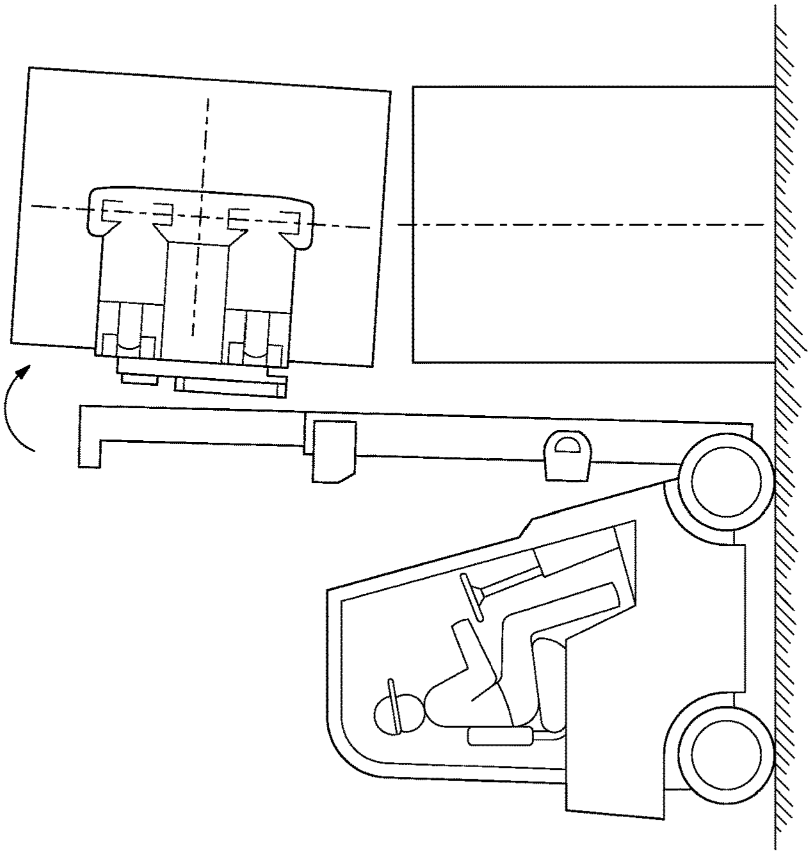

In some preferred embodiments, the disclosed attachments may include tilt compensation. Specifically, a counterbalanced load may experience fore/aft tilting due to deflection of the various truck components (truck chassis, mast and attachment) as counterbalance load is applied to the system, and this undesired tilt may adversely affect the positioning of the load when it is released. (FIG. 8A). Thus, in these embodiments, the upender or auxiliary tilting function may be actuated to achieve favorable load orientation when placing and releasing loads (FIG. 8B). In these embodiments, an accelerometer on the attachment may provide the necessary feedback to both detect an unwanted orientation and to correct for it. For example, with a target position of 0 degrees (vertical) and the mast of the vehicle deflecting 2 degrees forward due to the weight of the load, the disclosed systems and methods may detect the difference and automatically adjust the tilt position −2 degrees to compensate.

Also, the force of gravity may also adversely affect the clamp force on a load as the load is upended and rotated due to the fact that gravity may pulling the load downward on one clamp arm while pulling the load away from the other clamp arm. This may result in the clamp arms having undesirable asynchronous arm movement. The same may be true of forces due to acceleration as the load is moved, and frictional forces on one arm vary relative to the other. Thus, some embodiments of the disclosed clamp attachments may maintain arm positional synchronization regardless of clamp orientation, which factors in gravity assist/resist and variations in internal friction by using feedback arm position sensors to modulate pressure/flow to one or more of the arm actuators.

In some embodiments, a "request for oil" signal provided by the controller 122 also includes a pump motor speed request. When this is combined with a load sense pressure transducer mounted to the attachment hydraulics, a variable speed, fixed displacement, pressure compensated hydraulic system can be implemented to optimize energy usage by limiting the pump output flow to only what is required to meet pressure demand.

In some embodiments, the disclosed attachments may be set to three main operational modes. A first calibration mode may be used to allow attached rotary encoders to be semi-automatically calibrated by actuating the attachment functions through the maximum range of motion, and monitoring the pressure inputs to determine when the extent of each function has been reached. A second mode may provide for automatic operation mode, which may be the normal operating mode of the attachment. A third, manual operation mode may allow for direct manual control of the attachment, which may in some embodiments be used primarily for troubleshooting, diagnostics, and error recovery.

As disclosed above, the disclosed clamp attachments as well as the method of their operation provides improved clamp force control, which reduces or minimizes damage to grasped loads. Moreover, improved attachment longevity is achieved when the advanced clamp force control system disclosed herein is utilized by minimizing the clamp force to only the amount requires to adequately handle the load, by reducing stress generated within the attachment structure.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. An attachment to a material handling vehicle, the attachment comprising:

a pair of opposed clamp arms together configured to selectively grasp a load;

a plurality of directional control valves, each arranged to provide flow to and from respectively different hydraulic actuators for moving the pair of opposed clamp arms;

a proportional relief valve capable of selectively and continuously modulating pressurized fluid to each of the plurality of directional control valves to provide a clamp force on a grasped load;

a controller configured to receive load geometry data, use the load geometry data to calculate a target clamp force and variably control the proportional relief valve to provide the target clamp force.

2. The attachment of claim 1 having a short arm and a long arm.

3. The attachment of claim 1 where both clamp arms are of equal length.

4. The attachment of claim 1 where the controller receives geometrical data of a load to be clamped and calculates a target clamp force based on the diameter of the load.

5. The attachment of claim 1 where the geometry data is received from sensors on the attachment.

6. The attachment of claim 1 where the controller calculates the target clamp force using a stored relationship between a maximum clamp force of the attachment and a roll diameter.

7. The attachment of claim 1 where the controller uses a stored Clamp Force Factor to calculate the target clamp force.

8. The attachment of claim 1 where the controller adjusts an initially computed target clamp force based on the acceleration on at least one of the load, and a clamp arm.

9. The attachment of claim 8 where the acceleration is from gravity, and the adjustment is selectively made depending on a position of the clamp arms.

10. The attachment of claim 1 including a plurality of proportional relief valves, each independently operating a respectively different set of at least one actuator.

11. A method of controlling a material handling vehicle having a pair of opposed clamp arms together configured to selectively grasp a load, the method comprising:

receiving load geometry data;

use the load geometry data to calculate a target clamp force; and control a proportional relief valve on the attachment to cause the opposed pair of clamp arms to grasp the load at the target clamp force; the proportional relief valve capable of selectively and continuously modulating pressurized fluid to a plurality of directional control valves, each arranged to provide flow to and from respectively different hydraulic actuators for moving the pair of opposed clamp arms.

12. The method of claim 11 where the target clamp force is calculated using the diameter of the load.

13. The method of claim 11 where the geometry data is received from sensors on the attachment.

14. The method of claim 11 where the target clamp force is calculated using a stored relationship between a maximum clamp force of the attachment and a roll diameter.

15. The method of claim 11 where the target clamp force is calculated using a stored Clamp Force Factor.

16. A controller for controlling a material handling vehicle having a pair of opposed clamp arms together configured to selectively grasp a load, the controller operatively connected to storage storing geometry data of a load to be grasped, the controller configured to use the geometry data to control a proportional relief valve on the attachment to cause the opposed pair of clamp arms to grasp the load at a target clamp force calculated using the geometry data; the proportional relief valve capable of selectively and continuously modulating pressurized fluid to a plurality of directional control valves, each arranged to provide flow to and from respectively different hydraulic actuators for moving the pair of opposed clamp arms.

17. The controller of claim 16 where the target clamp force is calculated using the diameter of the load.

18. The controller of claim 16 where the geometry data is received from sensors on the attachment.

19. The controller of claim 16 where the target clamp force is calculated using a stored relationship between a maximum clamp force of the attachment and a roll diameter.

20. The controller of claim 16 where the target clamp force is calculated using a stored Clamp Force Factor.

* * * * *